United States Patent [19]

Sato et al.

[11] Patent Number: 5,955,528
[45] Date of Patent: Sep. 21, 1999

[54] POLYMERIC COMPOSITE MATERIAL AND PROCESS FOR MANUFACTURING THE SAME

[75] Inventors: Katsuhiro Sato; Yoshiyuki Ono, both of Minami-Ashigara, Japan

[73] Assignee: Fuji Xerox Co., Ltd., Tokyo, Japan

[21] Appl. No.: 08/886,257

[22] Filed: Jul. 1, 1997

[30] Foreign Application Priority Data

Jul. 4, 1996 [JP] Japan ..................................... 8-175257

[51] Int. Cl.$^6$ ....................................................... C08K 3/00
[52] U.S. Cl. ........................... 524/413; 524/418; 524/419; 524/420; 524/434; 524/435; 528/338; 528/339; 528/485; 528/487; 528/490
[58] Field of Search ..................................... 524/413, 418, 524/419, 420, 434, 435; 528/485, 487, 490, 338, 339

[56] References Cited

U.S. PATENT DOCUMENTS

| | | | |
|---|---|---|---|
| 5,253,103 | 10/1993 | Boyd et al. ............................... | 359/329 |
| 5,432,635 | 7/1995 | Tanahashi et al. ........................ | 359/326 |

FOREIGN PATENT DOCUMENTS

| | | |
|---|---|---|
| A-1-319985 | 12/1989 | Japan . |
| A-3-140335 | 6/1991 | Japan . |
| A-3-199137 | 8/1991 | Japan . |
| A-3-295826 | 12/1991 | Japan . |
| A-4-2632 | 1/1992 | Japan . |
| A-4-113334 | 4/1992 | Japan . |
| A-4-229807 | 8/1992 | Japan . |
| A-4-238304 | 8/1992 | Japan . |
| A-4-270131 | 9/1992 | Japan . |
| A-4-274223 | 9/1992 | Japan . |
| A-4-345136 | 12/1992 | Japan . |
| A-4-345139 | 12/1992 | Japan . |
| A-5-24826 | 2/1993 | Japan . |
| A-7-244305 | 9/1995 | Japan . |

OTHER PUBLICATIONS

"Degenerate four-wave mixing in semiconductor-doped glasses", by R.K. Jain and R.C. Line, Journal Optical Society of America, vol. 73, No. 5, pp. 647–653 May 1983.
"Synthesis and Some properties of $Na_2O$–$ZrO_2$–$SiO_2$ Glasses by the Sol–Gel Method," Japan Ceramic Association pp. 336–337, (1989).
"Microcrystalline PbS doped silcia glasses prepared by the sol–gel process" by M. Nogami et al., Journal of Non–Crystalline Solids, vol. 126, pp. 87–92 (1990).
"CdS microcrystallites–doped thin–film glass waveguides", by H. Jerominek et al., Journal Appl. Physics vol. 63, No. 3, pp. 957–959 (Feb. 1988).
"Erwin Ott, Alfred Langenohl und Willi Zerwech: Uber die Darstellung von 1.2–Dicarbonsaure–chloriden durch Einwirkung von Chlor auf die Thio–anhydride." Ber. vol. 392 No. 246 pp. 2360–2362 (1912).
"Arnold Reisser und Hermann Holle: Uber schwefel–und stickstoffhaltige Derivate der Phthalsaure", Ber. vol. 7, No. 706 pp. 3027–3040 (1874).

"Preparation of Polyimides from Pyromellitic Dithioahydride and Aromatic Diamines", Journal of Polymer SciencePart A–1 vol. 10, pp. 2091–2096 (1972).

(List continued on next page.)

*Primary Examiner*—Edward J. Cain
*Attorney, Agent, or Firm*—Oliff & Berridge, PLC

[57] ABSTRACT

Disclosed is a polymeric composite material in which metal sulfide microparticles having optical characteristics are uniformly dispersed and suspended in a high polymer material at high concentration. The polymeric composite material comprises metal sulfide microparticles formed by a reaction of a functional group in a matrix forming material having the functional group, the metal sulfide microparticles being dispersed in a matrix. It is desirable that the matrix includes a compound having the structure represented by formulae (1) to (5).

(1)

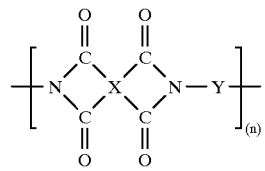

(2)

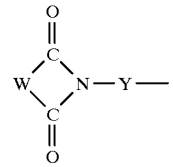

(3)

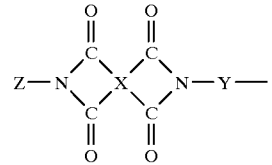

(4)

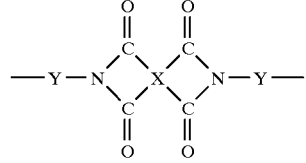

(5)

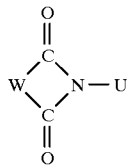

19 Claims, No Drawings

OTHER PUBLICATIONS

"Preparation of High Molecular Weight Poly(vinylaniline)", Journal of Polymer Science: Polymer Chemistry Edition vol. 13, pp. 1743–1744 (1975).

"Studies on the Preparation and Properties of Conductive Polymers. IV. Novel Method to Prepare Metallized Plastics from Metal Chelates of Polyamides–Imides", by Huang, Yen and Chang, Journal of Applied Polymer Science vol. 442, pp. 2267–2277 (1991).

"Syntheses and Characterization of Model Imide Compounds and Chemical Imidization Study," by Mohammed H. Kailani, Chong Sook Paik Sung, and Samuel J. Huang, Macromolecules vol. 25, pp. 3751–3757 (1992).

"Preparation of Polymer Membrane Doped with Cds Fine Particles by Counter Diffusion Method", by Hideaki Sasaki, Yoshio Kobayashi and Youichi Kurokawa, Kobunshi Ronbunshu, vol. 47, No. 11 pp. 935–938 (Nov. 1990).

POLYMERIC COMPOSITE MATERIAL AND PROCESS FOR MANUFACTURING THE SAME

BACKGROUND OF THE INVENTION

1. Field of the Invention

This invention relates to a polymeric composite material produced by dispersing metal sulfide semiconductor microparticles having optical characteristics such as a nonlinear optical effect, photoelectric converting characteristics, and the like. This invention also relates to a process for manufacturing the polymeric composite material.

2. Description of the Related Art

With advanced information processing, nonlinear optical materials having a large nonlinear optical effect are under investigation to produce an optical logic device, optical switch, and the like, which constitute fundamental techniques in optical computers.

Compounds conventionally known as the nonlinear optical materials include inorganic ferroelectric substances such as $LiNbO_3$, $BaTiO_3$, $KH_2PO_4$, and the like; quantum well structure semiconductors using GaAs or the like; organic monocrystals such as 4'-nitrobenzylidene-3-acetamino-4-methoxyaniline (MNBA), 2-methyl-4-nitroaniline (MNA), and the like; conjugate organic high polymers such as polydiacetylene, polyarylenevinylene, and the like; and semiconductor microparticle dispersion glass produced by dispersing CdS, CdSSe, and the like in glass. Especially, the semiconductor microparticle dispersion glass has been vigorously studied as promising nonlinear optical materials possessing both a high nonlinear optical susceptibility and high speed response since Jain and Lind discovered in the United States in 1983 that the so-called color glass filter prepared by dispersing semiconductor microparticles in glass exhibited a high tertiary nonlinear optical effect (for example, J. Opt. Soc. Am., 73, 647 (1983)).

Also, photoelectric converting devices such as the solar battery, photocatalyst, and the like have been studied with a view to utilizing clean energy. As typical materials for the photoelectric converting devices, compound semiconductors such as crystal silicon, noncrystal silicon, InGaP, CdS, and the like are known.

These materials are used either singly or after being made into a polymeric composite material by dispersing each of these materials in an inorganic high polymer, e.g. silica glass or an organic high polymer.

The following processes are proposed for manufacturing the polymeric composite material comprising metal sulfide microparticles dispersed in an inorganic high polymer:

The first example is described in J. Opt. Soc. Am., Vol. 73, 647 (1983). A mixture of glass as the dispersion medium or powder as the starting material thereof and $CdS_xSe_{1-x}$ are melted to form a glass molten liquid. This glass molten liquid is rapidly cooled to around room temperature to obtain a solid solution. The solid solution is then reheated to an appropriate temperature for a prescribed period of time to precipitate semiconductor microparticles (the so called "molten-rapid cooling process").

This molten-rapid cooling process, however, has the problem that the semiconductor raw materials are decomposed and evaporated since it is necessary to heat the semiconductor raw materials at temperatures above 1,000° C., so the appropriate sort of semiconductor and the amount of semiconductor to be added are limited.

The second process consists of the above molten-rapid cooling process or a process called the "sol-gel process" for preparing a medium by hydrolyzing silicon alkoxide or the like. Starting materials such as a metallic salt and the like are mixed to produce a polymeric composite material in which a metal salt is dispersed. The polymeric composite material is then processed either by hydrogen sulfide gas (see Abstracts of Lecture of Annual Meeting, Japan Ceramic Association, page 336, (1989); Journal of Non-Crystalline Solids, Vol. 126, 87 (1990); Japanese Patent Application Laid-Open (JP-A) Nos. 3-199137, 3-295826, and 4-274223) or by a solution containing a sulfur ion (see Japanese Patent Application Laid-Open (JP-A) Nos. 3-199137 and 4-270131).

In these processes, however, it is difficult to convert the metal salt within the polymeric composite material to metal sulfide homogeneously when the polymeric composite material including the dispersed metal salt is thick. Also, the particle diameter of the metal sulfide existing inside the polymeric composite material is different from that existing on the surface and hence the particle diameter of the metal sulfide cannot be controlled easily. Further, because hydrogen sulfide gas used in the process is highly toxic, it is operationally dangerous and hence a special safety device is required. Also, tetraalkoxysilane used in the conventional sol-gel process tends to generate cracks when drying the gel. When forming a thin film of tetraalkoxysilane on a substrate to make a device, only insufficient film thickness can be obtained. Conventionally, it is necessary to adopt a complicated process in which steps of forming a thin film with a thickness of about of 0.1 $\mu$m or less on a substrate and of baking the substrate at temperatures above several hundred degrees Celsius must be repeated to prepare sufficient film thickness for the device.

A third process is the so-called dry process. To exemplify the dry process, a known process for manufacturing semiconductor microparticle dispersion glass using glass or elemental semiconductor polycrystal of $SiO_2$, CdS, or the like or a mixture of these as targets by spattering is cited (see, for example, J. Appl. Phys., 63(3), 957 (1988); Japanese Patent Application Laid-Open (JP-A) Nos. 4-2632, 4-113334, and 4-345136). Other than the above, a process for forming a film using the CVD process is also known (see Japanese Patent Application Laid-Open (JP-A) Nos. 1-319985 and 4-345139). These processes enable semiconductors to be added in an amount larger than that possible in the molten-rapid cooling process.

In these dry processes, the apparatus is expensive and the film forming rate is low. Hence, there is the problem that a thick film cannot be formed easily, although the dry process can be utilized for forming a thin film. Also, the applicability of the device produced by the dry process is limited since the configuration of the device is limited to a thin film.

On the other hand, as the processes for preparing the polymeric composite materials comprising metal sulfide microparticles dispersed in an organic high polymer, the following processes are known. Similarly to the polymeric composite material comprising metal sulfide microparticles dispersed in an inorganic high polymer, a mixture in which a metal salt or the like is dispersed in an organic high polymer is prepared and then the mixture is processed by hydrogen sulfide gas (see Japanese Patent Application Laid-Open (JP-A) Nos. 4-229807 and 4-238304). This process is, however, carried out also using hydrogen sulfide gas, exhibiting the same problem as above.

In addition, there is still another known process including a solution reaction, in which chalcogenide semiconductor raw materials and a stabilizing agent (organic high polymer)

for chalcogenide semiconductor microparticles resulted from these raw materials are allowed to coexist and the raw materials are allowed to react with a chalcogenizing agent, followed by distilling the solvents used (see Japanese Patent Application Laid-Open (JP-A) No. 5-24826). Further, a process is known in which a hydroxide of Cd is sedimented in high polymer gel by an opposed diffusion process and then an aqueous $Na_2S$ solution is added to act on the sedimented hydroxide of Cd to convert it into CdS as described in High Polymer Theses, Vol. 47, 935 (1990). These processes, however, have the problems that a plurality of steps is required, the operations are complicated, usable high polymers are limited, and it is not easy to form a device having an optional shape. Also, there is the problem that the reaction residue of the chalcogenizing agent tends to remain as an impurity.

SUMMARY OF THE INVENTION

Accordingly, an object of the present invention is to solve the above conventional problems and thereby to provide a polymeric composite material comprising metal sulfide type semiconductor microparticles possessing optical characteristics, which are homogeneously dispersed and suspended in a high polymer material in a high concentration without a sulfidizing agent reaction residue which has an adverse effect on the characteristics of the polymeric composite material. Another object of the present invention is to provide a process for manufacturing the polymeric composite material in a simple apparatus at lower temperatures in a safe and simple manner.

The above first object can be attained by the provision of a polymeric composite material comprising metal sulfide microparticles formed by a reaction of a functional group in a matrix forming material having the functional group, the metal sulfide microparticles being dispersed in a matrix.

In preferred embodiments of the polymeric composite material, the above matrix is an organic compound.

The reaction of the functional group is preferably a reaction for forming hydrogen sulfide, or for forming hydrogen sulfide and an imide ring.

The above matrix preferably includes a high polymer compound having a repeating structural unit represented by the following formula (1):

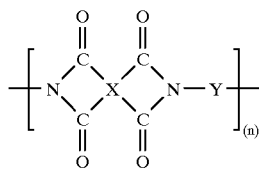

(1)

wherein X represents a tetravalent organic group having two or more carbon atoms, Y represents a divalent organic group having two or more carbon atoms, and n denotes a degree of polymerization.

The above matrix includes a high polymer compound possessing an imide structure represented by any one of the following formulae (2)–(4) at the side chain or the cross-linking portion:

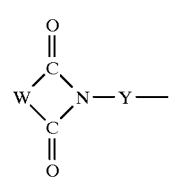

(2)

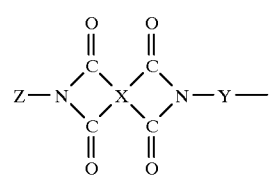

(3)

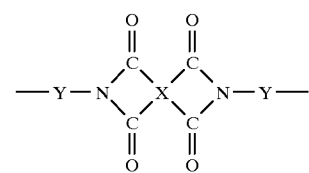

(4)

wherein X represents a tetravalent organic group having two or more carbon atoms, Y represents a divalent organic group having two or more carbon atoms, W represents an organic group having two or more carbon atoms which can combine with a carbonyl group to form an imide ring, and Z represents an alkyl group, aryl group, or aralkyl group.

The above matrix preferably includes an organic compound represented by the following formula (5):

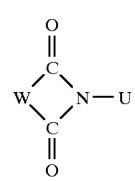

(5)

wherein W represents an organic group having two or more carbon atoms which can combine with a carbonyl group to form an imide ring and U represents a monovalent organic group in which an imide ring may be substituted.

The above matrix preferably includes two or more compounds selected from the group consisting of a high polymer compound having a repeating structural unit represented by the formula (1), a high polymer having an imide structure represented by any one of the formulae (2)–(4) at the side chain or the cross-linking portion, and the organic compound represented by the formula (5).

The above metal sulfide microparticle is preferably at least one sulfide particle of a compound selected from the group consisting of lead, cadmium, zinc, and copper.

The above second object can be attained by the provision of a process for manufacturing a polymeric composite material comprising:

a step of preparing a mixed solution of a matrix forming material having a functional group and a precursor of a metal sulfide; and a step of allowing the mixed solution to react with the functional group to form a matrix and to form metal sulfide microparticles within the matrix.

In preferred embodiments of the process for manufacturing the polymeric composite material of the present invention, the reaction of the functional group is a reaction for forming hydrogen sulfide, or for forming hydrogen sulfide and an imide ring.

The reaction for forming hydrogen sulfide is preferably a reaction of at least one of the compounds represented by the following formulae (11) and (12) and at least one compound selected from the group consisting of monoamines and polyamines:

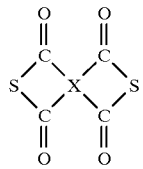
(11)

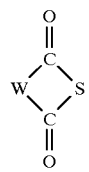
(12)

wherein X represents a tetravalent organic group having two or more carbon atoms and W represents an organic group having two or more carbon atoms which can combine with a carbonyl group to form an imide ring.

The above matrix forming material having a functional group preferably includes a high polymer compound having a structural unit represented by the following formula (6):

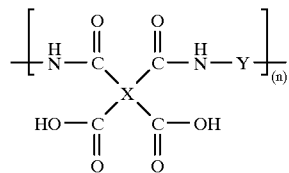
(6)

wherein X represents a tetravalent organic group having two or more carbon atoms, Y represents a divalent organic group having two or more carbon atoms, and n denotes a degree of polymerization.

The above matrix forming material having a functional group preferably includes a high polymer compound possessing an amic acid structure represented by any one of the following formulae (7)–(9) at the side chain or the cross-linking portion:

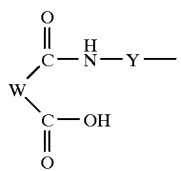
(7)

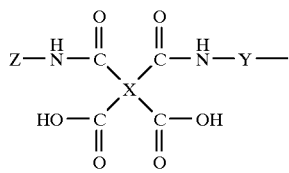
(8)

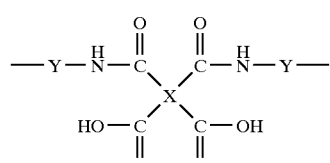
(9)

wherein X represents a tetravalent organic group having two or more carbon atoms, Y represents a divalent organic group having two or more carbon atoms, W represents an organic group having two or more carbon atoms which can combine with a carbonyl group to form an imide ring, and Z represents an alkyl group, aryl group, or aralkyl group.

The above matrix forming material having a functional group preferably includes an organic compound represented by the following formula (10):

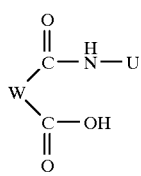
(10)

wherein W represents an organic group having two or more carbon atoms which can combine with a carbonyl group to form an imide ring and U represents a monovalent organic group in which an imide ring may be substituted.

The above matrix forming material having a functional group preferably includes two or more compounds selected from a group consisting of the high polymer compound having a repeating structural unit represented by the formula (6), high polymer compound having an amic acid structure represented by any one of the formulae (7)–(9) at the side chain or the cross-linking portion, and the organic compound represented by the formula (10).

The above metal sulfide microparticle is preferably at least one sulfide particle selected from the group consisting of lead, cadmium, zinc, and copper.

DESCRIPTION OF THE PREFERRED EMBODIMENTS

Polymeric Composite Material

The polymeric composite material of the present invention comprises metal sulfide microparticles formed by the reaction of a functional group contained in a matrix forming material having the functional group, the metal sulfide particles being dispersed in the matrix.

The following first to third embodiments are typified as the above polymeric composite material.

In the first embodiment, the polymeric composite material comprises metal sulfide microparticles dispersed in a matrix including at least a high polymer compound having the repeating structural unit represented by the formula (1).

In the second embodiment, the polymeric composite material comprises metal sulfide microparticles dispersed in a matrix including at least a high polymer compound having the imide structure represented by any one of the formulae (2)–(4) at the side chain or the cross-linking portion.

In the third embodiment, the polymeric composite material comprises metal sulfide microparticles dispersed in a matrix including at least the organic compound represented by the formula (5).

In the above formulae (1) to (5), X, Y, W, Z, and U are as follows:

As the typical examples of X, the organic residual groups represented by the following structural formulae X-1 to X-9 are given:

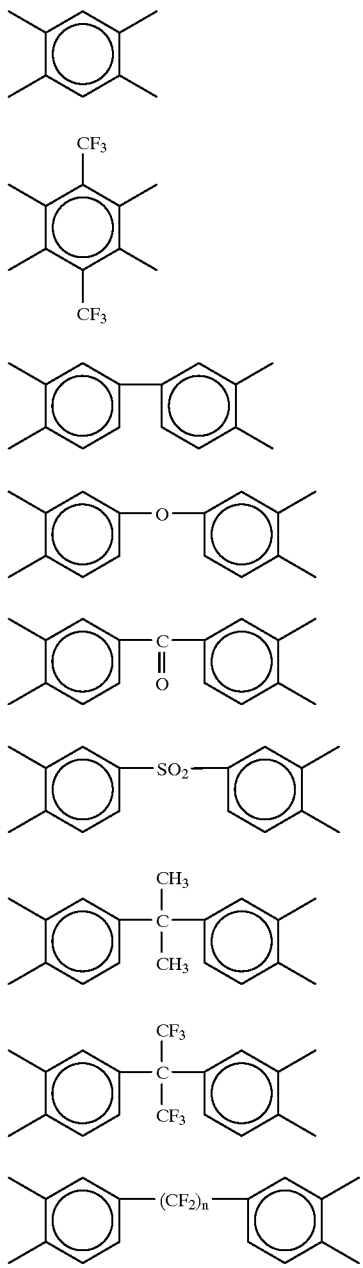

wherein n denotes an integer of from 1 to 6.

Typical examples of Y are the organic residual groups represented by the following structural formulae Y-1 to Y-25.

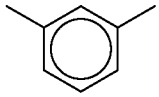
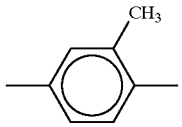
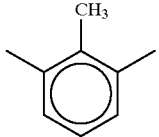
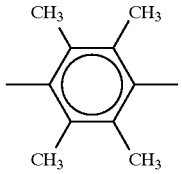
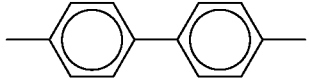
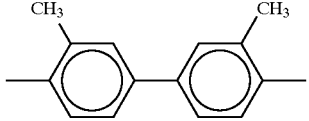
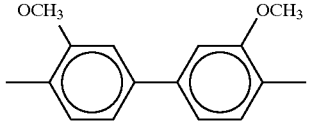
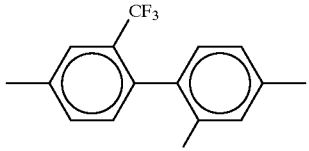
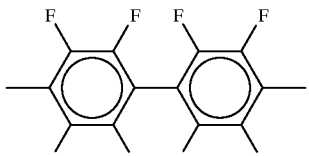

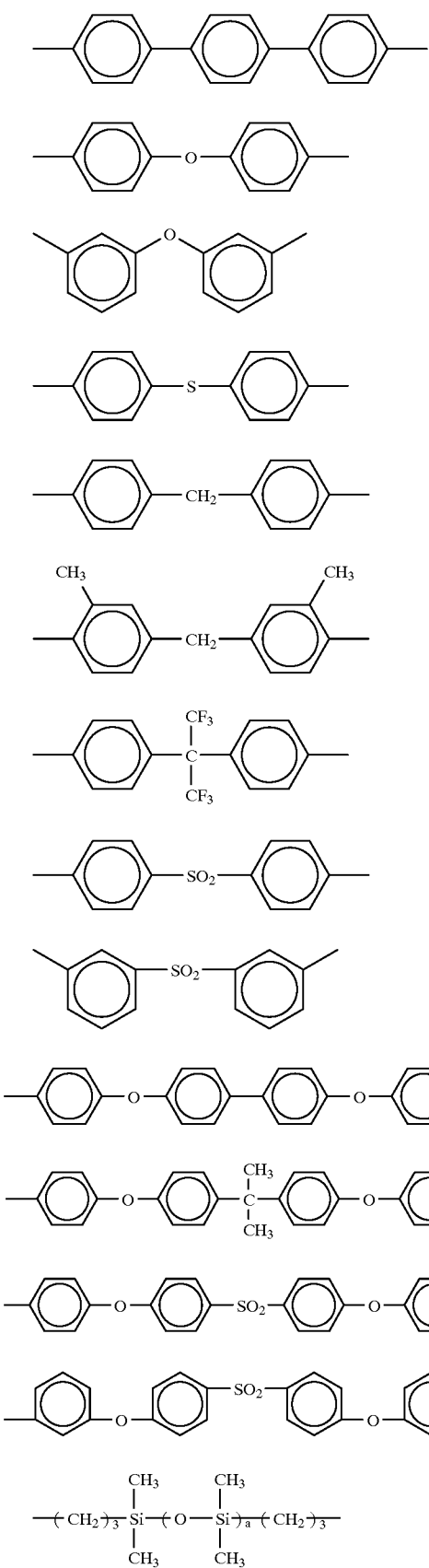

wherein a denotes an integer of from 1 to 1000.

As typical examples of W, the organic residual groups represented by the following structural formulae are given.

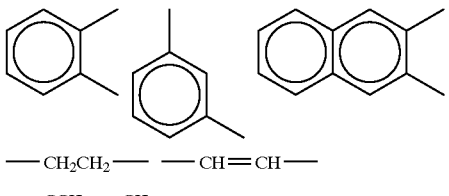

—CH₂CH₂—  —CH=CH—

—CCH₃=CH—

Typical examples of Z are an alkyl group, aryl group, or aralkyl group, and, more specifically, methyl group, ethyl group, benzyl group, phenyl group, p-methylphenyl group, and p-methoxyphenyl group.

Typical examples of U are an alkyl group, aryl group, or aralkyl group, and, more specifically, methyl group, ethyl group, benzyl group, phenyl group, p-methylphenyl group, and p-methoxyphenyl group.

Given as examples of the above metal sulfide microparticles are sulfide particles of Ag, Hg, Ni, Cu, Cd, Fe, Sn, Ge, Te, As, Zn, Mn, Pb, Co, and Ti.

Among these, Pb, Cd, Zn, Cu, or the like which can easily produce a sulfide is preferable, since metal sulfide microparticles having preferable light absorption characteristics must be selected depending on the use.

The average particle diameter of the metal sulfide microparticles is generally in the range of from 0.5 to 1,000 nm approximately, and preferably from 0.5 to 100 nm approximately, to exhibit excellent optical properties although it is not generally defined. If the average particle diameter is below the above defined range, the optical properties are insufficiently exhibited. If the average particle diameter exceeds the upper limit of the above defined range, it causes turbidity of the polymeric composite material.

The polymeric composite material of the present invention can be manufactured by the process for manufacturing the polymeric composite material of the present invention.

Process for Manufacturing Polymeric Composite Material

In the process for manufacturing the polymeric composite material of the present invention, first, a mixed solution of a matrix forming material having a functional group and a precursor of a metal sulfide is prepared (hereinafter, this step is called "first step" as the case may be). Next, the functional group is allowed to react with the mixed solution to form a matrix and also to form metal sulfide microparticles within the matrix (hereinafter this step is called "second step" as the case may be).

The matrix forming material having the functional group is a material capable of forming a matrix finally by a reaction of the functional group. In other words, the matrix forming material having the functional group is a material such as an inorganic polymer, or organic polymer, which is involved in a matrix composition obtained after the reaction of the functional group. Specifically, the matrix forming material is a material for forming a matrix except for the metal sulfide particles in the matrix composition.

The functional group is either a group having the function of generating hydrogen sulfide by a reaction or a group accelerating dissolution by interaction with the precursor of the metal sulfide.

As typical examples of the former matrix forming material having the functional group, thiocarboxylic acid anhydride and the like are given. Though the latter functional group is not essential, it is advantageous to use the functional group because the matrix can be doped with the metal sulfide microparticles at a high concentration when the matrix forming material contains the latter functional group. Typical examples of the latter functional group include a thiocarboxyl group, carboxyl group, amino group, amic acid group, and hydroxyl group. Incidentally, the former functional group may possess the function of the latter functional group.

The matrix forming material having a functional group comprises at least one of the polymer or the low molecular weight organic compounds having the functional group.

Typical examples of the matrix forming material having a functional group are compounds including a high polymer compound having a repeating structural unit represented by the formula (6), compounds including a high polymer having an amic acid structure represented by any one of the formulae (7)–(9) at the side chain or the cross-linking portion, and compounds including the organic compound represented by the formula (10). These compounds may be used either independently or in combinations of two or more.

The matrix forming material having a functional group may include a high polymer compound and inorganic polymer compound without the above functional groups as required and also may form a copolymer with a high polymer compound and inorganic high polymer compound without the above functional group.

Given as typical examples of X in formula (6) are the organic residual groups represented by the above structural formulae X-1 to X-9.

Given as typical examples of Y in formula (6) are the organic residual groups represented by the above structural formulae Y-1 to Y-25.

The high polymer compound having the repeating structural unit represented by the formula (6) can be synthesized from tetracarboxylic acid di-anhydride having the fundamental structure represented by X and diamine having the fundamental structure represented by Y.

Typical examples of X and Y in the high polymer compound having an amic acid structure represented by any one of the formulae (7)–(9) at the side chain or the cross-linking portion are similar to those for X and Y in formula (6).

As typical examples of W, the organic residual groups represented by the structural formulae below can be cited.

Typical examples of Z are an alkyl group, aryl group, or aralkyl group, and, more specifically, methyl group, ethyl group, benzyl group, phenyl group, p-methylphenyl group, and p-methoxyphenyl group.

There are no limitations to the structure of the main chain of the polymer having at least one of the amic acid structures represented by any one of the formulae (7)–(9) at the side chain or the cross-linking portion. Examples of the main structure include a polyethylene type resin, polystyrene type resin, polyacrylate type resin, polymethacrylate type resin, polycarbonate type resin, polyester type resin, cellulose type resin, silicon resin, vinyl type resin, polyamide type resin, polyamideimide type resin, polyurethane type resin, polyurea type resin, or copolymers of these resins.

The high polymer having at least one amic acid structure represented by any one of the formulae (7)–(9) at the side chain or the cross-linking portion can be synthesized either by allowing a high polymer having an amino group at the side chain or the cross-linking portion to react with dicarboxylic acid anhydride or tetracarboxylic acid di-anhydride or by allowing a high polymer having an acid anhydride structure at the side chain or the cross-linking portion to react with an amine or a diamine.

Also, a monomer of the above high polymer is subjected to a similar reaction to synthesize a monomer having an amic acid structure, which is then polymerized to obtain a high polymer having at least one amic acid structure represented by any one of the formulae (7)–(9) at the side chain or the cross-linking portion.

For the high polymer, having at least one amic acid structure represented by any one of the formulae (7)–(9) at the side chain or the cross-linking portion, it is desirable to use compounds which adequately dissolve precursors of the metal sulfide and in which the functional group changes under heat or chemical treatment and the chemical properties change and which have a sufficiently low absorption for the light of the wavelength to be used.

Typical examples of W in the organic compound represented by formula (10) are the same as those of W in formula (7).

Typical examples of U are an alkyl group, aryl group, and aralkyl group, and, more specifically, methyl group, ethyl group, benzyl group, phenyl group, p-methylphenyl group, and a p-methoxyphenyl group.

The organic compounds represented by the formula (10) can be synthesized by reacting dicarboxylic acid with amine.

For the high polymer not comprising the above functional groups, compounds which are sufficiently transparent for the light of the wavelength to be used although there are no limitations to the kinds of the high polymer. Examples of the high polymer not comprising the above functional groups include a polyethylene type resin, polystyrene type resin, polyacrylate type resin, polymethacrylate type resin, polycarbonate type resin, polyester type resin, cellulose type resin, silicon resin, vinyl type resin, polyamide type resin, polyamideimide type resin, polyurethane type resin, polyurea type resin, or copolymers of these resins.

Such high polymers not comprising the above functional groups may be used as long as the effects of the present invention are not impaired; as long as optical transparency does not drop through phase separation or the like. These high polymers may be used independently or in combinations of two or more.

It is advantageous to use the high polymer not comprising the above functional groups because the mechanical characteristics: resistance, refractive index, and dielectric constant can be controlled.

Examples of the inorganic high polymer, high polymers constructed from the following compounds and capable of producing inorganic high polymers are given below:

Though there are no limitations to the compounds capable of producing the above inorganic high polymer, exemplified are compounds capable of producing inorganic high polymers such as silicon compounds using a sol-gel process, for example, as described in Japanese Patent Application Laid-Open (JP-A) No. 7-244305. Given as typical examples of the silicon compound and the like are $CH_3SiCl_3$, $CH_3Si(NCO)_3$, $CH_3Si(OCH_3)_3$, $CH_3Si(OCH_2CH_3)_3$, $CH_3Si(O(CH_2)_2CH_3)_3$, $CH_3Si(OCH(CH_3)_2)_3$, $CH_3Si(O(CH_2)_3$ $CH_3)_3$, $CH_3Si(OC(CH_3)_3)_3$, $ClCH_2Si(OCH_2CH_3)_3$, $CH_3CH_2SiCl_3$, $CH_3CH_2Si(OCH_3)_3$, $CH_3CH_2Si(OCH_2CH_3)_3$, $CH_3CH_2Si(O(CH_2)_2CH_3)_3$, $CH_3CH_2Si(OCH(CH_3)_2)_3$, $CH_3CH_2Si(O(CH_2)_3CH_3)_3$, and $CH_3CH_2Si(OC(CH_3)_3)_3$.

These compounds capable of a producing inorganic high polymer can be used as long as the effects of the present invention are not impaired. These compounds may be used independently or in combinations of two or more.

The precursor of metal sulfide is a material capable of producing metal sulfide by reaction with a compound containing a sulfur atom.

Given as typical examples of the precursor of the metal sulfide are metal halides such as $AgI$, $HgI_2$, $Hg_2Cl_2$, $NiCl_2$, $CuCl$, $CuCl_2$, $ZnCl_2$, $CdCl_2$, $FeCl_3$, $SnCl_2$, $GeCl_2$, and the like; metal acids such as $H_2TeO_3$, $H_3AsO_4$, and the like; inorganic acid salts such as $AgNO_3$, $Hg(NO_3)_2 \cdot 1/2H_2O$, $ZnSO_4$, $Cd(ClO_4)_2$, $CuSO_4$, $NiSO_4$, and the like; carboxylic acid salts such as $CH_3COOAg$, $Zn(CH_3COO)_2 \cdot 2H_2O$, $Cu(CH_3COO)_2 \cdot H_2O$, $Mn(CH_3COO)_2 \cdot 4H_2O$, $Cd(CH_3COO)_2 \cdot 2H_2O$, $Sn(CH_3COO)_2$, $Pb(C_8H_{18}O_2)_2$, $Co(C_8H_{18}O_2)_2$, $Fe(C_8H_{18}O_2)_2$, lead 2-ethylhexanoate, and the like; alkoxides such as $Ge(CH_3O)_4$, $Ti(C_2H_5O)_4$, and the like; and organic metal chelates such as $Fe(C_5H_5O_2)_2$, $Fe(C_5H_5O_2)_3$, $Mn(C_5H_5O_2)_2$, and the like.

The above-described mixed solution is prepared by dissolving the matrix forming material having a functional group and the precursor of the metal sulfide into a solvent.

Examples of the solvent include polar organic solvents such as dimethylformamide, dimethylacetamide, n-methylpyrrolidone, dimethyl sulfoxide, dimethyl sulfonamide, m-cresol, p-chlorophenol, dimethylimidazoline, tetramethylurea, diglime, triglime, tetraglime, and the like.

It is preferable that the intrinsic viscosity ($\eta$) of the matrix forming material having a functional group, which is measured at 30° C. in a solvent, e.g. dimethylacetamide, be in the range of from 0.1 to 6 dl/g.

If the intrinsic viscosity ($\eta$) is not more than 0.1 dl/g, the film forming capability is sometimes insufficient whereas if the intrinsic viscosity exceeds 6 dl/g, the coating characteristics may sometimes deteriorate.

The intrinsic viscosity ($\eta$) is determined, first by calculating the relative viscosity or reduced specific viscosity at each concentration of a polymer from measurements of relative viscosity at various concentrations of the polymer and, next, by extrapolating the resulting relative or reduced viscosity to a concentration of 0.

The mixed solution includes a compound capable of converting the precursor of the metal sulfide into metal sulfide microparticles.

For such a compound, for example, compounds which can produce hydrogen sulfide by a reaction may be used.

In the present invention, there are no limitations to the kinds of these compounds as long as they produce no residual material with possible adverse effects on the characteristics of the polymeric composite material after reaction. However, it is preferable to use compounds which can be changed to have the structures represented by any one of the above formulae (1) to (5) after reaction. Among these, thiocarboxylic acid anhydride represented by any one of the formulae (11) and (12) is especially preferable.

The thiocarboxylic acid anhydride can be synthesized from the corresponding carboxylic acid anhydride or the like according to a method described in Ber., Vol. 70, 2360 (1937), Ber., Vol. 44, 3027 (1911), or the like.

Each of the high polymer compounds or organic compounds having the structures represented by the formulae (6) to (10) has many amic acid structures as the functional group and hence it interacts with various inorganic elements and inorganic compounds. Therefore, the mixed solution containing the high polymer compound or organic compound represented by the formulae (6) to (10) can dissolve the precursor of the metal sulfide stably in a comparatively high concentration both before and after the solvent is removed from the mixed solution.

The mixed solution is coated using known processes such as spin coating or dip coating to form a desired shape such as a film or fiber, which is then subjected to a heat or chemical treatment.

The reaction of the functional group in the present invention includes reactions for forming a matrix and metal sulfide microparticles. In the present invention, the reaction for forming a matrix includes a reaction for forming an imide ring and the reaction for forming metal sulfide microparticles includes a reaction for forming hydrogen sulfide.

The reaction of the functional group includes, a cyclization reaction, condensation reaction, addition reaction, and elimination reaction within a molecule or between molecules.

The reaction of the functional group is induced by a chemical treatment utilizing heat, light, catalyst, and the like.

The temperature in the heating step is generally in the range of from 30 to 400° C., and preferably from 50 to 300° C.; any temperature lower than the temperature at which the matrix is decomposed. Incidentally, the temperature may be controlled stepwise in the course of heating.

The above chemical treatment includes dipping into a solvent to cause dehydrocyclization. Examples of the solvent include an acetic acid anhydride/pyridine mixed solvent, acetic acid anhydride/pyridine/benzene mixed solvent, acetic acid anhydride/pyridine/dimethylacetamide mixed solvent, and the like. Among these, the acetic acid anhydride/pyridine mixed solvent is desirable in the present invention. The ratio by weight of acetic acid anhydride to pyridine in the acetic acid anhydride/pyridine mixed solvent is preferably about 1:1.

The time required for the heat treatment or chemical treatment, during which the imide ring forming reaction or hydrogen sulfide forming reaction is terminated, is preferably in the range of from 0.5 to 48 hours, although there are no specific limitations to the time.

Typical examples of the reaction for forming the matrix include (A) an imide ring forming reaction by heat or chemical treatment, (B) a reaction of a functional group such as a carboxyl group, amino group, hydroxyl group, carboxylic acid anhydride, or the like with an isocyanate group, epoxy group, or the like, (C) an acid addition-salt forming reaction by acid treatment of an amino compound, and (D) other reactions.

As an example of reaction (A), the following reaction is given: This reaction for forming an imide structure by dehydrocyclization in the amic acid structure can occur in all of the high polymer compounds or organic compounds represented by the formulae (6) to (10).

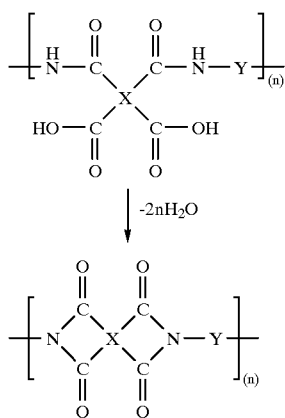

wherein n denotes a degree of polymerization.

By this reaction, the amic acid structure in the high polymer compound or organic compound represented by any one of the formulae (6) to (10), which is the matrix forming material, disappears and the imide structure represented by any one of the formulae (1) to (5) is formed, whereby a matrix having the imide structure is newly formed.

The reaction for forming the metal sulfide microparticles indicates the reaction in which (1) the interaction of the precursor of the metal sulfide and the functional group is reduced or eliminated by the reaction of the functional group and also (2) metal sulfide microparticles are produced by a hydrogen sulfide generating reaction.

Various reactions described in Japanese Patent Application Laid-Open (JP-A) No.7-244305 are given as examples of the reaction (1). In the case of the reaction (1), the functional group has the function of interacting with the precursor of the metal sulfide to promote dissolution of the precursor and thereby to increase the doping amount of the precursor before the reaction of the functional group, and the function of decreasing or eliminating the interaction after the reaction of the functional group. The reaction (1) may be induced by the reaction of a compound capable of converting the precursor of the metal sulfide into a metal sulfide.

In this case, the precursor of the metal sulfide is converted into metal sulfide microparticles, which are dispersed in the matrix.

At this time, when the compound capable of converting the precursor of the metal sulfide into the metal sulfide is thiocarboxylic acid anhydride represented by any one of the formulae (11) and (12), the thiocarboxylic acid anhydride is converted into a matrix having the structure represented by any one of the formulae (1) to (5). Therefore, it is advantageous that the resulting polymeric composite material does not contain excess reaction residues.

Typical examples of the reaction (2) include a hydrogen sulfide generating reaction is given in which at least one of the thiocarboxylic acid anhydrides represented by any one of the formulae (11) and (12) is allowed to react with at least one of the monoamines or polyamines like the amine used in the step of synthesizing amic acid for promoting dissolution of the precursor of the metal sulfide.

The generation of hydrogen sulfide by the reaction of the thiocarboxylic acid anhydride and the amines occurs readily at a temperature of from 10 to 100° C. as described in J. Poly. Sci., Part A-1, Vol. 10, 2091 (1972) and the like. As a result, the thiocarboxylic acid anhydride is converted into a compound having an imide ring structure.

Examples of the solvent used in the hydrogen sulfide forming reaction include ethanol, pyridine, dimethylacetamide, and the like. When amic acid is used in combination for accelerating dissolution of the precursor of the metal sulfide, the same solvent as that used in process of dissolution the precursor of the metal sulfide can be used.

1 to 3 equivalents of the monoamine and/or polyamine used in the hydrogen sulfide forming reaction are generally used for each equivalent of the thiocarboxylic acid anhydride to effect the reaction sufficiently, and preferably one equivalent to prevent excess presence of amines.

1 to 100 equivalents of the thiocarboxylic acid anhydride used in the hydrogen sulfide forming reaction for each equivalent of the precursor of the metal sulfide are used to effect the reaction sufficiently, and preferably from 1 to 10 equivalents.

Each of the thiocarboxylic acid anhydrides and monoamines and/or polyamines may be used either singly or in combinations of two or more.

The high molecular weight or low molecular weight amic acids represented by the formulae (6) to (10) are used for the amic acid for promoting the dissolution of the precursor of the metal sulfide. In the present invention, these amic acids may be used either singly or in combinations of two or more. Also, these compounds may be used in combination with the high polymer or inorganic high polymer without the functional group.

The high molecular weight or low molecular weight amic acid represented by the formulae (6) to (10) is changed to a compound having the imide structure represented by any one of the formulae (1) to (5) by heat or chemical treatment.

Compounds other than the high molecular weight or low molecular weight amic acids represented by the formulae (6) to (10) may be used if these compounds have the functions of interacting with the precursor of the metal sulfide to promote dissolution of the precursor and the function of decreasing or eliminating the interaction owing to a structural change by heat or chemical treatment, thereby producing the metal sulfide microparticles. That is, compounds which can be used instead of the amic acid may be those which sufficiently promote the dissolution of the precursor of the metal sulfide before the heat or chemical treatment, change in chemical characteristic after the treatment, and are transparent to the light of the wavelength to be used when these are utilized as a device.

The amount of each of these compounds in the above mixed solution is generally 100 equivalents or less preferably 10 equivalents or less to the precursor of the metal sulfide, though there are no specific limitations.

If the product resulting from the hydrogen sulfide forming reaction between at least one of the thiocarboxylic acid anhydrides, represented by one of the formulae (11) and (12), and at least one of the monoamines and polyamines creates the matrix containing the high polymer compound having the structure represented by the formulae (1) to (5), the amic acid for promoting the dissolution of the precursor of the metal sulfide need not be used.

There are no limitations to the sequence for adding each component. It is preferable that the high polymer or low polymer amic acid be prepared in advance in view of promoting the dissolution of the precursor of the metal sulfide.

Each step in the process for forming the polymeric composite material of the present invention may be carried out either under normal conditions or in a closed system. In the latter case, scattering of hydrogen sulfide can be avoided and is thus preferred.

In the second step in the present invention, aftertreatments such as a further treatment using hydrogen sulfide, sodium sulfide, and the like, heat decomposition of the organic matrix, carbonizing, and the like may be carried out after the reaction of the functional group. Implementation of these aftertreatments is advantageous since the metal sulfide microparticles can be formed precisely and the electroconductivity of the matrix can be increased.

The aftertreatments are carried out at temperatures below the decomposition temperature of the high polymer compound which is the matrix. The time and other conditions are the same as those of the reaction for the functional group.

EXAMPLES

The present invention will be explained in more detail by way of examples.

Example 1

50 mg of diaminodiphenyl ether represented by the structural formula (13) illustrated below was dissolved in 1.0 ml of dimethylacetamide. 27 mg of pyromellitic acid di-anhydride represented by the structural formula (14) illustrated below was gradually added to the mixture. The resulting solution was slowly agitated for one hour while maintaining a temperature of 10–15° C. and further agitated for 2 hours while maintaining a temperature of 20–25° C. To the solution was added 31 mg of pyromellitic acid dithioanhydride represented by the structural formula (15) described below and the mixture was agitated for 30 minutes. 28 mg of lead 2-ethylhexanoate dissolved in 0.5 ml of dimethylacetamide was then added to the mixture, which was further agitated for 15 minutes to prepare a mixed solution.

The mixed solution was applied to a glass substrate by spin-coating. The glass substrate was heated at 50° C. for 30 minutes, at 140° C. for one hour, and at 250° C. for one hour under a nitrogen stream with a volumetric velocity of 200 ml/min. to obtain a clear, black, thin film.

The resulting film was observed using a transmission-type electron microscope to confirm precipitation of microparticles. The average particle diameter of the microparticles was about 10–30 nm. Also, lead and sulfur were detected by X-ray fluorescence analysis to confirm the generation of a metal sulfide.

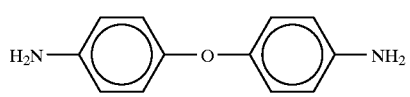
(13)

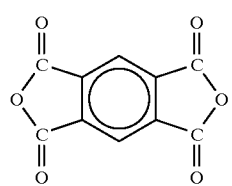
(14)

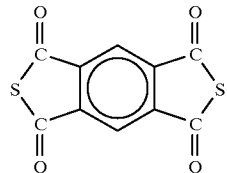
(15)

Example 2

50 mg of diaminodiphenyl ether represented by the structural formula (13) was dissolved in 1.0 ml of dimethylacetamide. 27 mg of pyromellitic acid di-anhydride represented by the structural formula (14) was gradually added to the mixture. The resulting solution was slowly agitated for one hour while maintaining a temperature of 10–15° C. and further agitated for 2 hours while maintaining a temperature of 20–25° C. To the solution was added 7 mg of zinc chloride and then 31 mg of pyromellitic acid dithioanhydride represented by the structural formula (15). The mixture was agitated for one hour to prepare a mixed solution.

The mixed solution was applied to a glass substrate by spin-coating. The glass substrate was allowed to stand at room temperature for 30 minutes. The glass substrate was then heated at 50° C. for 30 minutes, at 140° C. for one hour, and at 250° C. for one hour under a nitrogen stream with a volumetric velocity of 200 ml/min. to obtain a transparent film.

The resulting film was observed using a transmission-type electron microscope to confirm precipitation of microparticles. The average particle diameter of the microparticles was about 5–30 nm. Also, zinc and sulfur were detected by X-ray fluorescence analysis to confirm the generation of a metal sulfide.

Example 3

130 mg of 2,2'-bis[4-(4-aminophenoxy) phenyl] hexafluoropropane represented by the structural formula (16) illustrated below was dissolved in 1.0 ml of dimethylacetamide. 55 mg of 4,4'-(hexafluoroisopropylidene) phthalic anhydride represented by the structural formula (17) illustrated below was gradually added to the mixture. The resulting solution was slowly agitated for one hour while maintaining a temperature of 10–15° C. and further agitated for 2 hours while maintaining a temperature of 20–25° C. To the solution was added 60 mg of 4,4'-(hexafluoroisopropylidene) thiophthalic anhydride represented by the structural formula (18) illustrated below and the mixture was agitated for 30 minutes. 28 mg of lead 2-ethylhexanoate dissolved in 0.5 ml of dimethylacetamide was then added to the mixture, which was further agitated for 15 minutes to prepare a mixed solution.

The mixed solution was applied to a glass substrate by spin-coating. The glass substrate was heated at 50° C. for 30 minutes, at 140° C. for one hour, and at 250° C. for one hour under a nitrogen stream with a volumetric velocity of 200 ml/min. to obtain a clear, black, thin film.

The resulting film was observed using a transmission-type electron microscope to confirm precipitation of microparticles. The average particle diameter of the microparticles was about 10–35 nm. Also, lead and sulfur were detected by X-ray fluorescence analysis to confirm the generation of a metal sulfide.

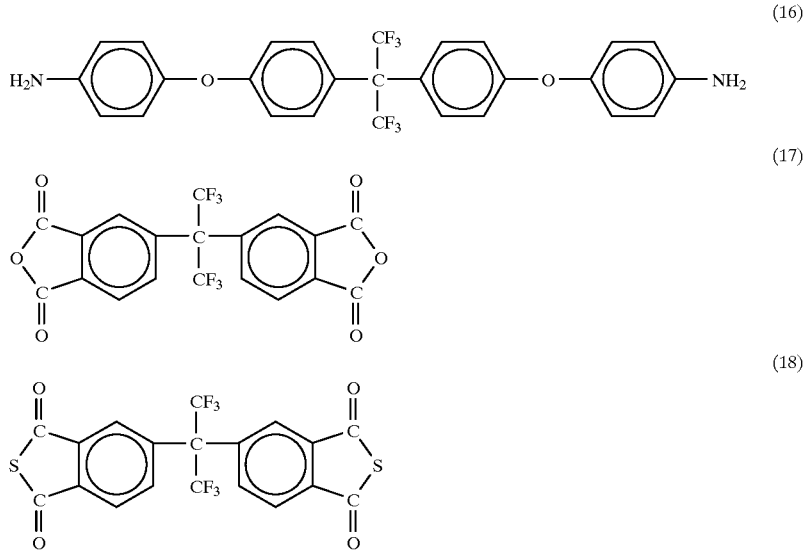

(16)

(17)

(18)

Example 4

A film was prepared in the same manner as in Example 3 except that 31 mg of pyromellitic acid dithioanhydride represented by the structural formula (15) was used instead of 60 mg of 4,4'-(hexafluoroisopropylidene) thiophthalic anhydride represented by the structural formula (18).

The resulting film was observed using a transmission-type electron microscope to confirm precipitation of microparticles. The average particle diameter of the microparticles was about 10–35 nm. Also, lead and sulfur were detected by X-ray fluorescence analysis to confirm the generation of a metal sulfide.

Example 5

A film was prepared in the same manner as in Example 2 except that 9 mg of cadmium chloride was used instead of zinc chloride.

The resulting film was observed using a transmission-type electron microscope to confirm precipitation of microparticles. The average particle diameter of the microparticles was about 10–40 nm. Also, cadmium and sulfur were detected by X-ray fluorescence analysis to confirm the generation of a metal sulfide.

Example 6

A film was prepared in the same manner as in Example 1 except that the sample including the glass substrate was dipped in a mixed solution of acetic acid anhydride/pyridine/benzene (ratio by volume: 4:3.5:8) in a dry nitrogen atmosphere for 12 hours instead of heating at 250° C.

The resulting film was observed using a transmission-type electron microscope to confirm precipitation of microparticles. The average particle diameter of the microparticles was about 10–35 nm. Also, lead and sulfur were detected by X-ray fluorescence analysis to confirm the generation of a metal sulfide.

Example 7

35 mg of poly-p-aminostyrene (synthesized according to the process described in C. Kotlarchik, L. M. Minsk: J. Polymer Sci. Polym. Chem. Ed., Vol. 13, 1743 (1975)) was dissolved in 1.0 ml of dimethylformamide. The mixture was agitated while 19 mg of phthalic anhydride represented by the structural formula (19) illustrated below was gradually added to the mixture, followed by agitating for 3 hours. To the solution was added 21 mg of thiophthalic anhydride represented by the structural formula (20) described below and the mixture was agitated for 30 minutes. 28 mg of lead 2-ethylhexanoate dissolved in 0.5 ml of dimethylacetamide was then added to the mixture, which was further agitated for 15 minutes to prepare a mixed solution.

The mixed solution was applied to a glass substrate by spin-coating. The glass substrate was heated at 50° C. for 30 minutes and at 140° C. for 2 hours to obtain a film.

The resulting film was observed using a transmission-type electron microscope to confirm precipitation of microparticles. The average particle diameter of the microparticles was about 20–50 nm. Also, lead and sulfur were detected by X-ray fluorescence analysis to confirm the generation of a metal sulfide.

(19)

(20)

Example 8

35 mg of poly-p-aminostyrene was dissolved in 1.0 ml of dimethylformamide. The mixture was agitated while 1 mg of pyromellitic acid dianhydride was gradually added to the mixture, followed by agitating for 24 hours. To the solution containing a high polymer compound was further added 10 mg of p-toluidine. The mixture was agitated for 3 hours. 50 mg of thiophthalic anhydride represented by the structural formula (20) was added to the solution and the mixture was agitated for 30 minutes. 28 mg of lead 2-ethylhexanoate dissolved in 0.5 ml of dimethylacetamide was then added to the mixture, which was further agitated for 15 minutes to prepare a mixed solution.

The mixed solution was applied to a glass substrate by spin-coating. The glass substrate was heated at 50° C. for 30 minutes and at 140° C. for 2 hours to obtain a film.

The resulting film was observed using a transmission-type electron microscope to confirm precipitation of microparticles. The average particle diameter of the microparticles was about 20–50 nm. Also, lead and sulfur were detected by X-ray fluorescence analysis to confirm the generation of a metal sulfide.

Example 9

A film was prepared in the same manner as in Example 1 except that 5 mg of polyamideimide represented by the structural formula (21) described below (synthesized according to the process described in C. J. Huang, et al.: J. Appl. Polym. Sci, 42, 2267 (1991); intrinsic viscosity at 30° C. in N-methyl-2-pyrrolidone: 1.42 dl/g) was added to the mixed solution.

The resulting film was observed using a transmission-type electron microscope to confirm precipitation of microparticles. The average particle diameter of the microparticles was about several nm to several dozen nm. Also, lead and sulfur were detected by X-ray fluorescence analysis to confirm the generation of metal sulfide.

The resulting film was observed using a transmission-type electron microscope to confirm precipitation of microparticles. The average particle diameter of the microparticles was about 10–40 nm. Also, lead and sulfur were detected by X-ray fluorescence analysis to confirm the generation of a metal sulfide.

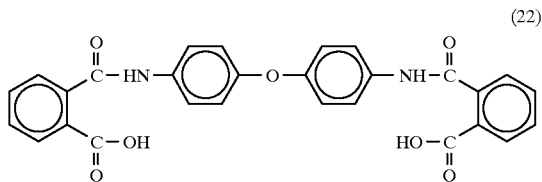

Example 11

A film was prepared in the same manner as in Example 1 except that 2 mg of the compound represented by the structural formula (22) was added to the mixed solution.

The resulting film was observed using a transmission-type electron microscope to confirm precipitation of microparticles. The average particle diameter of the microparticles was about 10–30 nm. Also, lead and sulfur were detected by X-ray fluorescence analysis to confirm the generation of a metal sulfide.

The conventional problems can be solved by the present invention.

The present invention ensures the provision of a polymeric composite material of high quality, in which metal sulfide type semiconductor microparticles possessing optical characteristics are homogeneously dispersed and suspended in a high polymer material in a high concentration and a sulfidizing agent reaction residue having an adverse effect

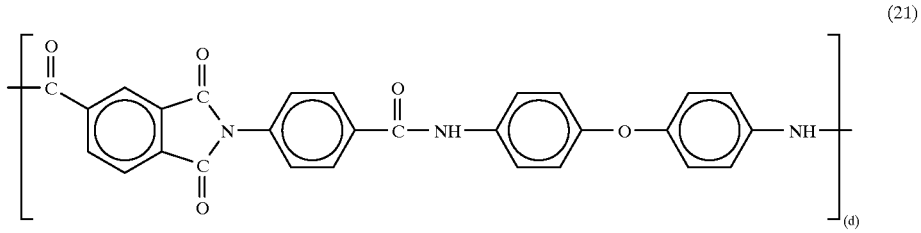

wherein n denotes a degree of polymerization.

Example 10

15 mg of the compound represented by the structural formula (22) below (synthesized according to the process described in M. H. Kailani, et al.: Macromolecules, 25, 3751 (1992)) was dissolved in a solution in which 50 mg of polyamideimide represented by the structural formula (21) was dissolved in 5 ml of dimethylformamide. 20 mg of diaminodiphenyl ether represented by the structural formula (13) was dissolved in the solution. To the mixture was added 28 mg of pyromellitic acid dianhydride represented by the structural formula (15) and the resulting mixture was agitated for 30 minutes. 28 mg of lead 2-ethylhexanoate dissolved in 0.5 ml of dimethylacetamide was then added to the mixture, which was further agitated for 15 minutes to prepare a mixed solution.

The mixed solution was applied to a glass substrate by spin-coating. The glass substrate was heated at 50° C. for 30 minutes and at 140° C. for 2 hours to obtain a film.

on the characteristics of the polymeric composite material is excluded. The polymeric composite material of the present invention is preferably applied to opto-electronic fields including an optical switch, optical memory, wavelength converting device, photoelectric conversion device, and the like. The polymeric composite material of the present invention is preferably used for manufacturing devices having excellent optical characteristics, mechanical strength, and the like.

The present invention ensures the provision of a process for manufacturing the polymeric composite material at lower temperatures in a simple apparatus in a safe manner. In the process for manufacturing the polymeric composite material of the present invention, materials which are easily decomposed and vaporized can be used. No complicated processes are required. The polymeric composite material is easily manufactured. Also, polymeric composite materials having an optional shape such as a film shape, plate shape, block shape, fiber shape, or the like can be produced.

What is claimed is:

1. A polymeric composite material comprising metal sulfide microparticles formed by the reaction of a functional group selected from a functional group which accelerates dissolution of a precursor of said metal sulfide and a functional group which reacts to form hydrogen sulfide in a matrix forming material having the functional group, the metal sulfide microparticles being dispersed in a matrix.

2. A polymeric composite material according to claim 1, wherein said functional group is a functional group which accelerates dissolution of a precursor of said metal sulfide.

3. A polymeric composite material according to claim 1, wherein said matrix is an organic material.

4. A polymeric composite material according to claim 1, wherein said reaction of said functional group is a reaction for forming hydrogen sulfide.

5. A polymeric composite material according to claim 1, wherein said reaction of said functional group is a reaction for forming hydrogen sulfide and an imide ring.

6. A polymeric composite material according to claim 1, wherein said matrix includes a high polymer compound having a repeating structural unit represented by formula (1):

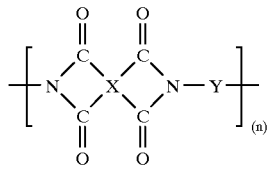
(1)

wherein X represents a tetravalent organic group having two or more carbon atoms, Y represents a divalent organic group having two or more carbon atoms, and n denotes a degree of polymerization.

7. A polymeric composite material according to claim 1, wherein said matrix includes a high polymer compound possessing an imide structure represented by any one of formulae (2)–(4) at the side chain or the cross-linking portion:

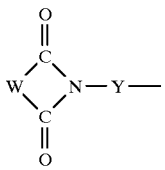
(2)

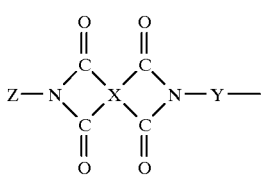
(3)

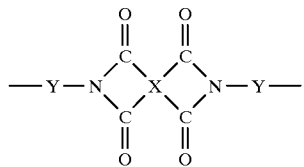
(4)

wherein X represents a tetravalent organic group having two or more carbon atoms, Y represents a divalent organic group having two or more carbon atoms, W represents an organic group having two or more carbon atoms which can combine with a carbonyl group to form an imide ring, and Z represents an alkyl group, aryl group, or aralkyl group.

8. A polymeric composite material according to claim 1, wherein said matrix includes an organic compound represented by formula (5):

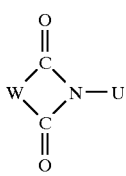
(5)

wherein W represents an organic group having two or more carbon atoms which can combine with a carbonyl group to form an imide ring and U represents a monovalent organic group in which an imide ring may be substituted.

9. A polymeric composite material according to claim 1, wherein said matrix contains two or more compounds selected from the group consisting of a high polymer compound having a repeating structural unit represented by formula (1), a high polymer compound having an imide structure represented by any one of formulae (2)–(4) at the side chain or the cross-linking portion, and an organic compound represented by formula (5):

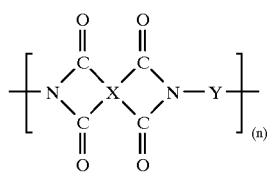
(1)

wherein X represents a tetravalent organic group having two or more carbon atoms, Y represents a divalent organic group having two or more carbon atoms, and n denotes a degree of polymerization;

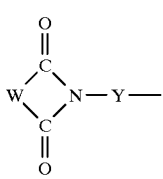
(2)

(3)
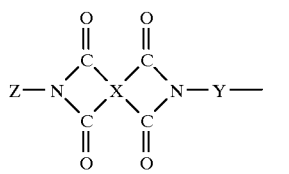

(4)
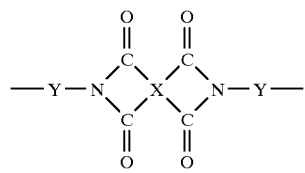

wherein X represents a tetravalent organic group having two or more carbon atoms, Y represents a divalent organic group having two or more carbon atoms, W represents an organic group having two or more carbon atoms which can combine with a carbonyl group to form an imide ring and Z represents analkyl group, aryl group, or aralkyl group;

(5)
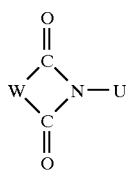

wherein W represents an organic group having two or more carbon atoms which can combine with a carbonyl group to form an imide ring and U represents a monovalent organic group in which an imide ring may be substituted.

10. A polymeric composite material according to claim 1, wherein said metal sulfide microparticle is at least one sulfide microparticle selected from the group consisting of lead, cadmium, zinc, and copper.

11. A process for manufacturing a polymeric composite material comprising:
    a step of preparing a mixed solution of a matrix forming material having a functional group and a precursor of a metal sulfide; and
    a step of reacting said functional group to form a matrix and to form metal sulfide microparticles within said matrix.

12. A process for manufacturing a polymeric composite material according to claim 11, wherein said reaction of said functional group is a reaction for forming hydrogen sulfide.

13. A process for manufacturing a polymeric composite material according to claim 11, wherein said reaction of said functional group is a reaction for forming hydrogen sulfide and an imide ring.

14. A process for manufacturing a polymeric composite material according to claim 12, wherein said reaction for forming hydrogen sulfide is a reaction of at least one of compounds represented by formulae (11) and (12) and at least one compound selected from the group consisting of monoamines and polyamines:

(11)
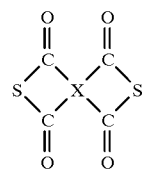

(12)
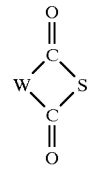

wherein X represents a tetravalent organic group having two or more carbon atoms and W represents an organic group having two or more carbon atoms which can combine with a carbonyl group to form an imide ring.

15. A process for manufacturing a polymeric composite material according to claim 11, wherein said matrix forming material having a functional group includes a high polymer compound having a structural unit represented by formula (6):

(6)
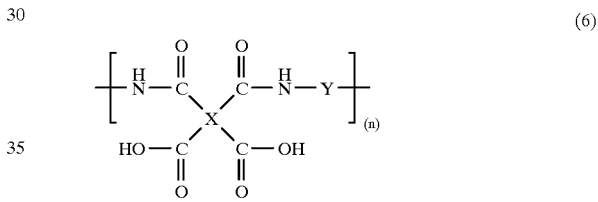

wherein X represents a tetravalent organic group having two or more carbon atoms, Y represents a divalent organic group having two or more carbon atoms, and n denotes a degree of polymerization.

16. A process for manufacturing a polymeric composite material according to claim 11, wherein said matrix forming material having a functional group includes a high polymer compound possessing an amic acid structure represented by any one of formulae (7)–(9) at the side chain or the cross-linking portion:

(7)
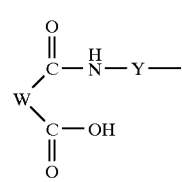

(8)
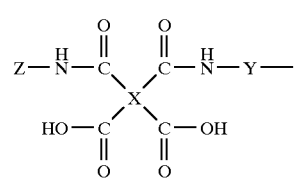

(9)

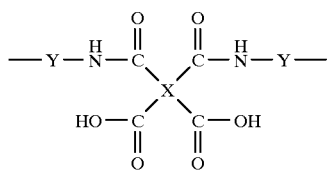

wherein X represents a tetravalent organic group having two or more carbon atoms, Y represents a divalent organic group having two or more carbon atoms, W represents an organic group having two or more carbon atoms which can combine with a carbonyl group to form an imide ring, and Z represents an alkyl group, aryl group, or aralkyl group.

17. A process for manufacturing a polymeric composite material according to claim 11, wherein said matrix forming material having a functional group includes an organic compound represented by formula (10):

(10)

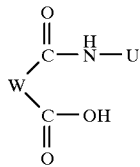

wherein W represents an organic group having two or more carbon atoms which can combine with a carbonyl group to form an imide ring and U represents a monovalent organic group in which an imide ring may be substituted.

18. A process for manufacturing a polymeric composite material according to claim 11, wherein said matrix forming material having a functional group includes two or more compounds selected from the group consisting of a high polymer compound having a repeating structural unit represented by formula (6), high polymer compound having an amic acid structure represented by any one of formulae (7)–(9) at the side chain or the cross-linking portion, and an organic compound represented by formula (10):

(6)

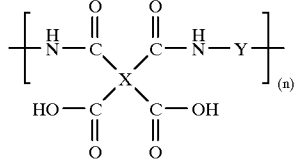

wherein X represents a tetravalent organic group having two or more carbon atoms, Y represents a divalent organic group having two or more carbon atoms, and n denotes a degree of polymerization;

(7)

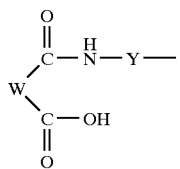

(8)

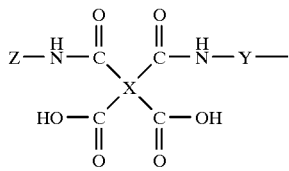

(9)

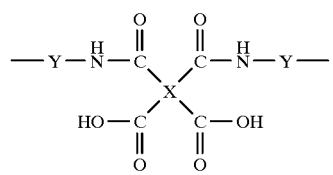

wherein X represents a tetravalent organic group having two or more carbon atoms, Y represents a divalent organic group having two or more carbon atoms, W represents an organic group having two or more carbon atoms which can combine with a carbonyl group to form an imide ring, and Z represents an alkyl group, aryl group, or aralkyl group;

(10)

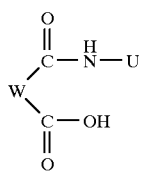

wherein W represents an organic group having two or more carbon atoms which can combine with a carbonyl group to form an imide ring and U represents a monovalent organic group in which an imide ring may be substituted.

19. A process for manufacturing a polymeric composite material according to claim 11, wherein said metal sulfide microparticle is at least one sulfide particle selected from the group consisting of lead, cadmium, zinc, and copper.

* * * * *